Feb. 7, 1967     A. MERTWOY ET AL     3,302,447
PRESSURIZED 4-BALL WEAR TESTER
Filed Aug. 10, 1964
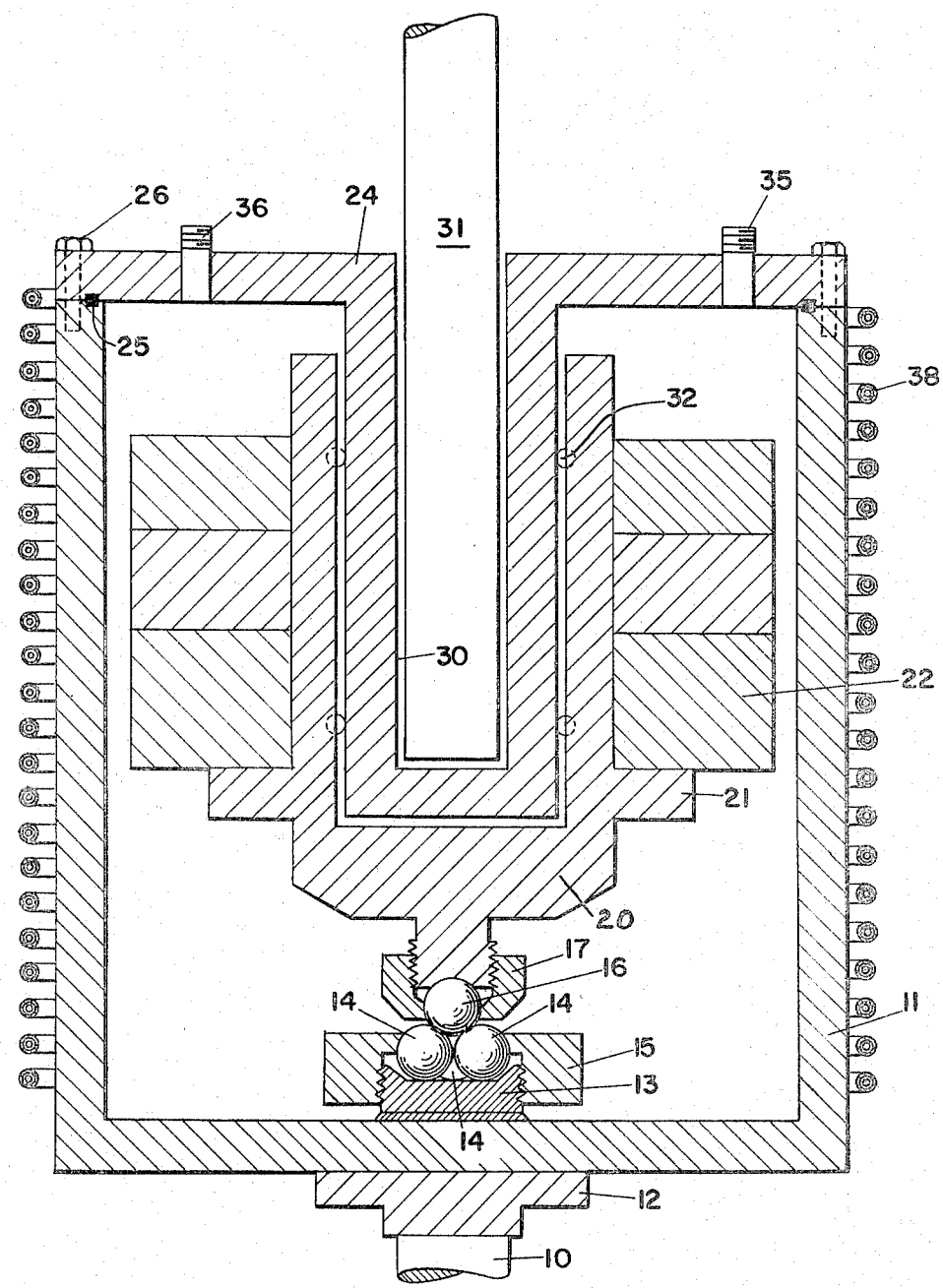
INVENTORS.
ABRAHAM MERTWOY
HENRY GISSER,
BY *Harry M. Saragovitz,*
*Edward J. Kelly, Herbert Berl &*
*S. Dubroff*     ATTORNEYS

3,302,447
PRESSURIZED 4-BALL WEAR TESTER
Abraham Mertwoy, Roslyn, and Henry Gisser, Philadelphia, Pa., assignors to the United States of America as represented by the Secretary of the Army
Filed Aug. 10, 1964, Ser. No. 388,732
3 Claims. (Cl. 73—10)

The invention described herein may be manufactured and used by or for the Government for governmental purposes without the payment to us of any royalty thereon.

This invention relates to testing devices and more particularly concerns novel apparatus for determining the controlled effect of temperature and pressure on the anti-wear properties of hydraulic fluids.

Until now, the determination of anti-wear properties of hydraulic fluids have been obtained by generally mounting full scale operational components in a selected fluid media which would simulate or approach the type of system in which the selected fluid would be operating. The components would then be motorized by conventional means for a given period of time at predetermined temperatures and pressures after which the entire assembly or system would be carefully dismantled and the metallic components examined for wear and weight loss. The hydraulic media, oil or lubricants would be chemically analyzed therewith.

The aforedescribed full scale mock-up possesses the singular advantage of properly predicting the performance of a given system when used with a specific fluid. However, the amount of fluid needed is often in excess of a gallon and such quantities of experimental fluids may not be readily available. Further, in the above mock-up system, uncontrolled variables are necessarily introduced, i.e., the varying compositions of the metallic components used, the varying tolerances of rubbing and sliding components, etc. Fluid flow, pressure differentials, temperature, etc. will vary at different locations of the mock-up making it difficult to isolate or ascertain the cause of fluid breakdown. Still further, the weight loss of the metallic components used in the mock-up, is oftentimes misleading where the fluid media permit welding and breaking of mating surfaces to thereby yield an actual increase in weight. This last mentioned factor is of particular difficulty in evaluating the more complex hydraulic components of piston pumps, for example, which requires certain specialized skills.

It is therefore a broad object of this invention to provide a device for testing fluids which is substantially free of the aforementioned disadvantages.

Another object of the invention is to provide a wear testing device wherein the components thereof are readily and easily controllable.

A further object of the invention is to provide a four-ball wear testing system permitting controlled pressurization therein and yet the device is small, unitary and economical to produce.

The exact nature of this invention as well as other objects and advantages thereof will be readily apparent from consideration of the following specification relating to the annexed drawing wherein the single figure illustrates a longitudinal section through a preferred embodiment of our device.

Referring now to the drawing, a shaft 10 from a motor (not shown) rotates pressure vessel 11 through a bushing 12 mounted thereto. The pressure vessel may be stainless steel, for example, and capable of withstanding internal pressures of the order of at least 12,000 p.s.i. and temperatures of 500° F. Centrally secured therewithin and to the base of the vessel is centering device 13 for receiving three test balls 14 which are held immobile by a centering clamp 15 as is well known in the lubrication art.

Upper ball 16, made of the same material as the test balls, is received in an adjustable chuck 17, also well known in the art, and is mounted conveniently to weight carrier 20, made of a magnetic metal and which is provided with an annular lip 21 upon which weights 22, suitably of lead, are placed. Weight carrier assembly including the upper ball may be lowered into position by removing lid 24 which forms a pressure tight seal within pressure vessel 11 by means of a gasket or O-ring 25 and a plurality of screws 26 mounted therearound. Lid 24 is provided with a central well 30, which optionally may receive a magnet 31 to help prevent any rotation of the weight carrier. Alignment bearings 32 are carried in the inner wall of weight carrier 20 and permit unimpeded rotation of the pressure vessel, lid and lower ball assembly in accordance with the speed of shaft 10 while the weight carrier assembly remains substantially stationary within the vessel.

Fluid is introduced through fluid inlet passageway 35 and the vessel is vented at outlet passageway or oil overflow 36, both of which are capable of receiving caps or valves to insure pressure tightness within the vessel.

The pressure vessel and its contents may be heated in any convenient manner, as by placement within an oven, for example, or as shown conveniently in the drawings, by electric coils 38, and thus permitting testing at controlled temperatures as well as pressures.

In the actual testing of an experimental fluid, the three test balls 14 will be clamped into position by means of the centering clamp 15 and the weight carrier assembly lowered into the position shown with upper ball 16 resting comfortably on the three test balls. The pressure of the upper ball against the lower balls wil be controlled by the amount of weight used. The lid will then be sealed pressure-tight and test fluid introduced through the inlet passageway while the outlet passageway will remain open. The temperature may now be raised, the outlet passageway remaining open. After the desired temperature is obtained, the vent will be sealed and the pressure raised by the introduction of additional fluid, the temperature being maintained generally constant.

Rotation of the shaft then causes the pressure vessel 11 and the test ball assembly, lid 24 and well 30 to rotate therewith. The motor driving the shaft should be capable of rotating the vessel at speeds of 600, 1,200 and 1,800 r.p.m. While the vessel is rotating at one of these speeds, we have found the weight carrier assembly to remain substantially stationary. However, in the testing of certain experimental fluids where scoring and seizing of the balls was considerable, any tendency of the weight carrier to rotate with the vessel was eliminated when a strong magnet was lowered into the well.

From the foregoing description, it is apparent that we have provided an unique four-ball wear tester which admirably simulates the actual operating conditions under which the experimental hydraulic fluids will be subjected and yet being unitary, compact, meager in its demands for fluid and operable by personnel requiring only ordinary skill.

Our device has typically a five to six inch inside diameter and a height of about nine inches. If only very small amounts of experimental fluid are available, hollow "doughnuts" capable of withstanding the pressure used may be added to the weight carrier or around the balls so as not to interfere with their operation. Further, our invention is not limited to metallic components only, but nylon balls, for example may be used advantageously.

We claim:
1. A hydraulic fluid testing device wherein said fluid is subjected to controlled elevated temperatures and pressures, said device comprising
- a pressure vessel for containing said fluid,
- a pressure-tight lid removably mounted on said vessel,
- a fluid inlet and a fluid and air outlet sealably mounted on said lid for controlling pressures up to about 12,000 p.s.i. on said fluid within said vessel,
- a plurality of test balls disposed centrally immobile at a base portion within said vessel,
- an upper ball contacting each of said test balls,
- means for maintaining said upper ball stationary and for supporting said upper ball centrally of said test balls and in contacting relation therewith, said means comprising a hollow cylindrical weight carrier,
- said carrier including an annular lip at a lower portion thereof for carrying weights thereon and a chuck at the lowermost portion of said carrier for adjustably gripping said upper ball, and other means for rotating said test balls while said upper ball remains substantially stationary.

2. The device of claim 1 further characterized by said lid having a centrally depending well and
- a magnet disposed within said well and spaced therefrom.

3. The device of claim 2 wherein said well rotates against bearings disposed in said carrier, said carrier remaining substantially stationary.

References Cited by the Examiner
UNITED STATES PATENTS 2,019,948    11/1935    Boerlage _____ 73—10

FOREIGN PATENTS 165,836    4/1950.    Austria.

DAVID SCHONBERG, *Primary Examiner.*